Patented June 21, 1949

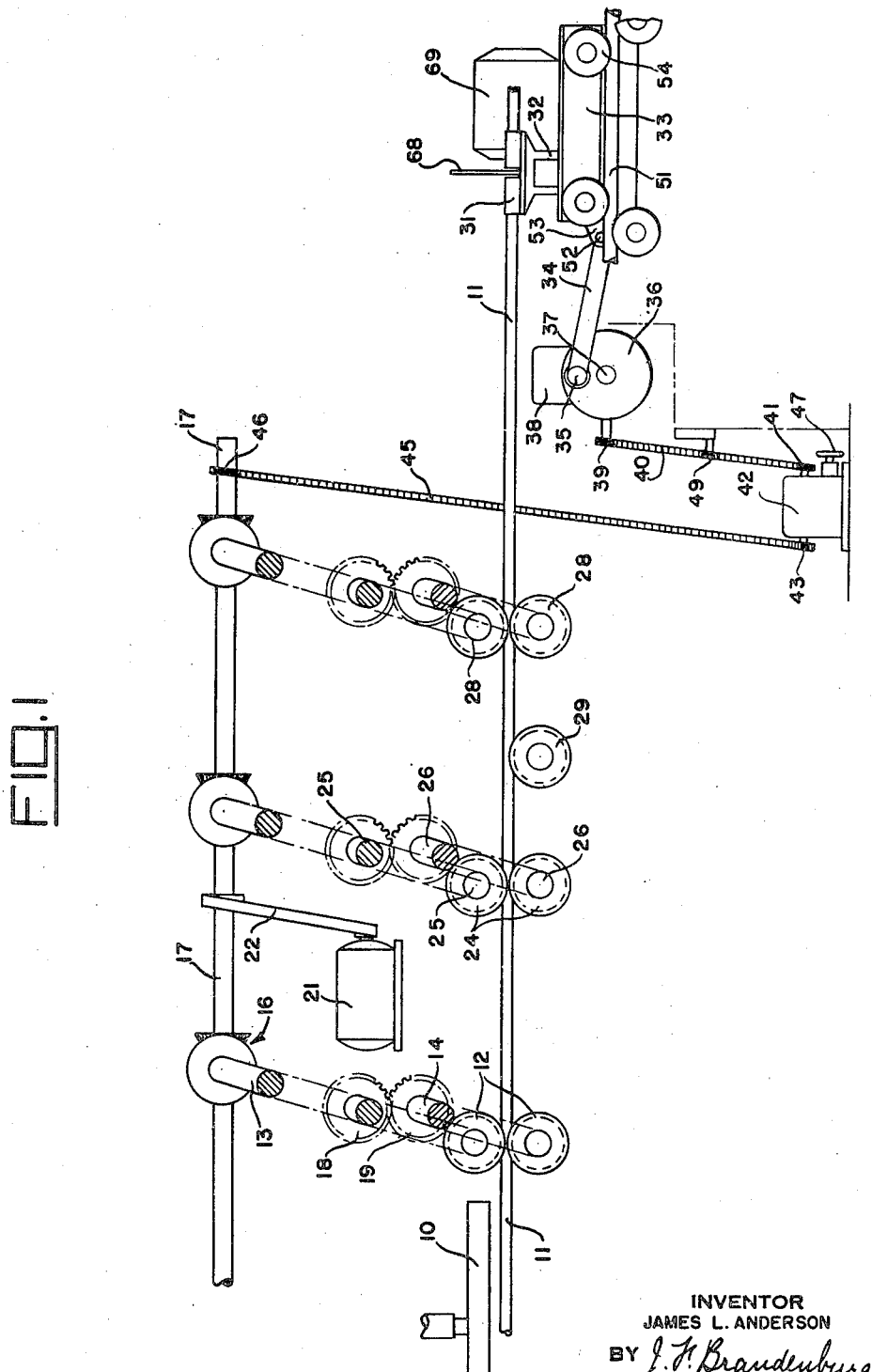

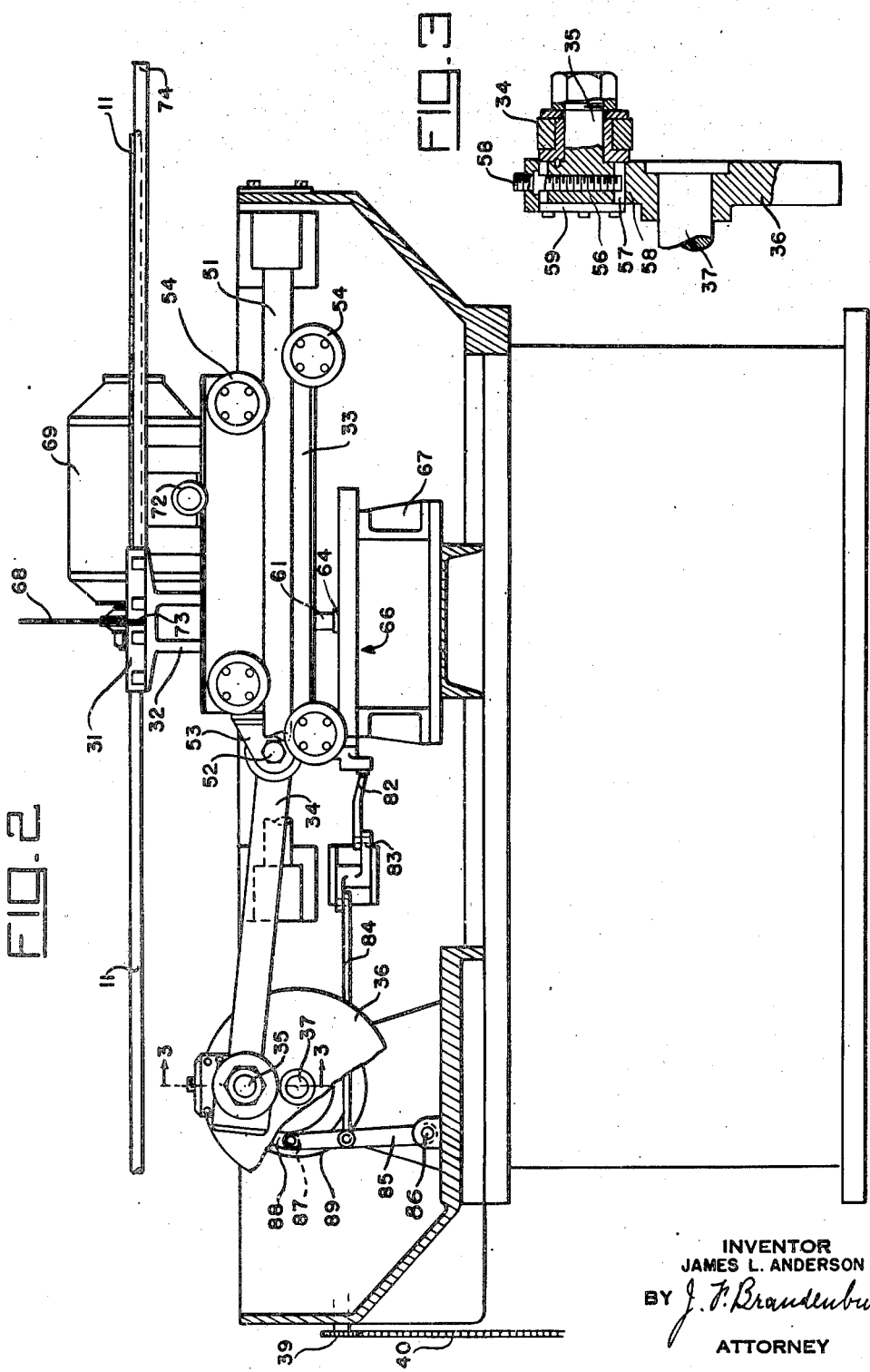

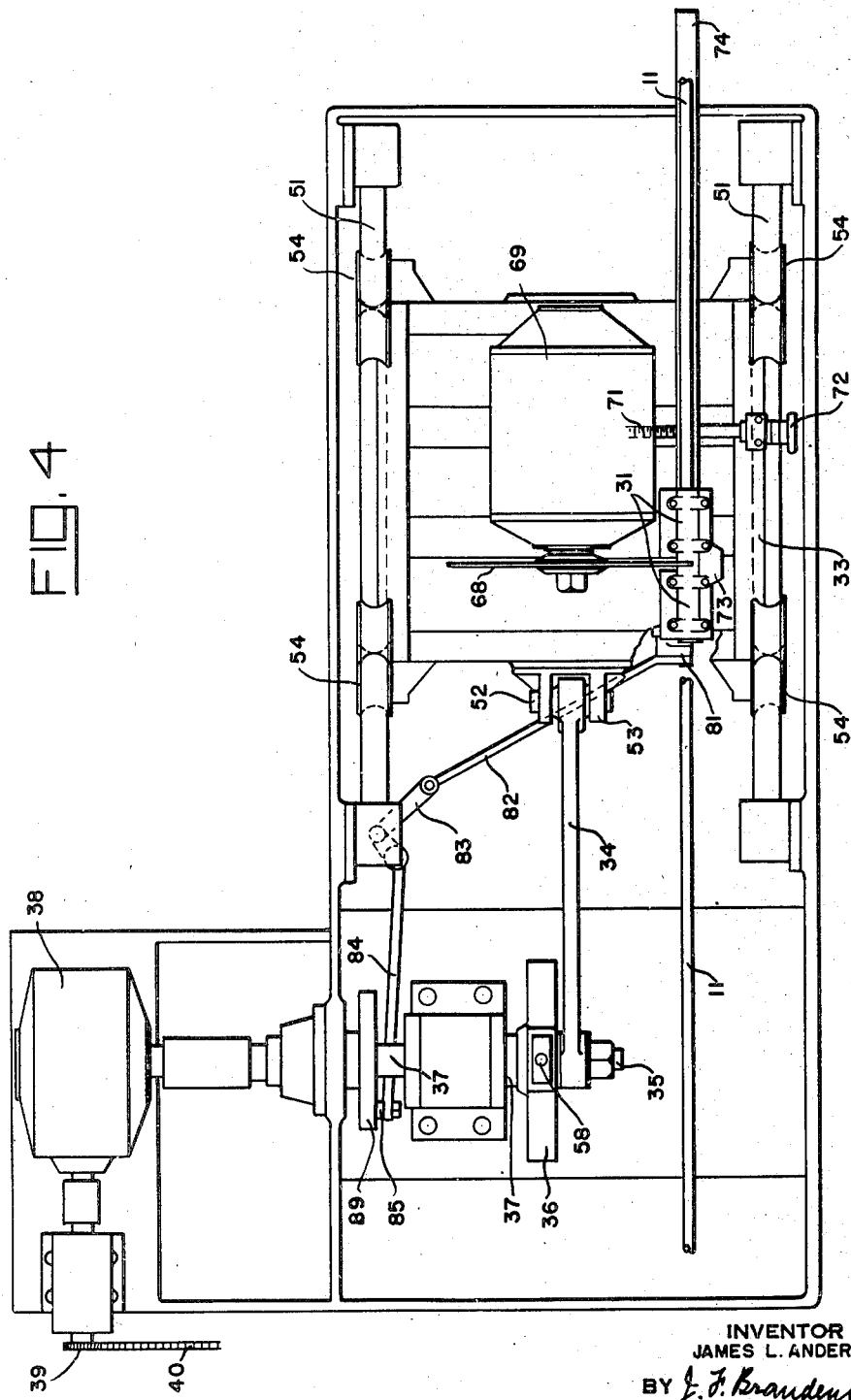

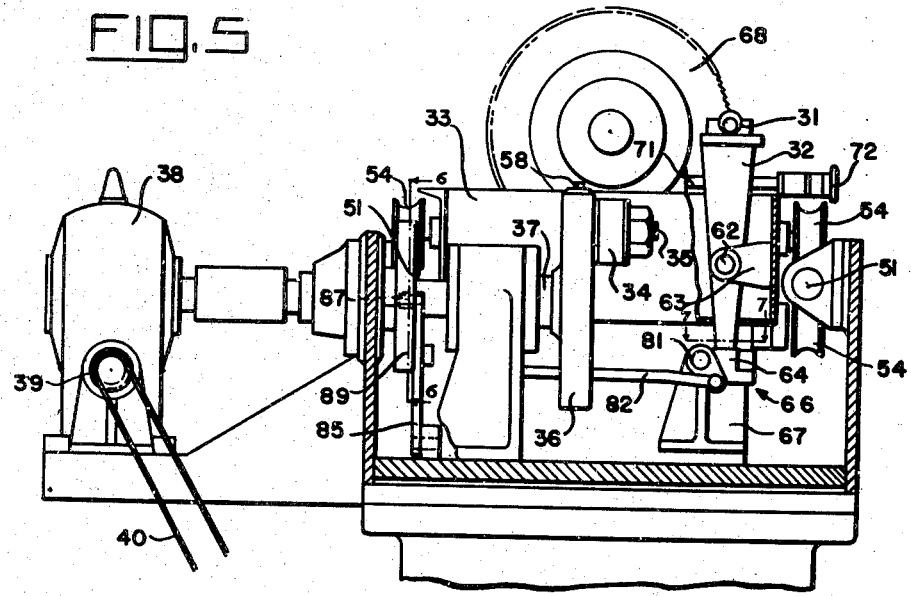
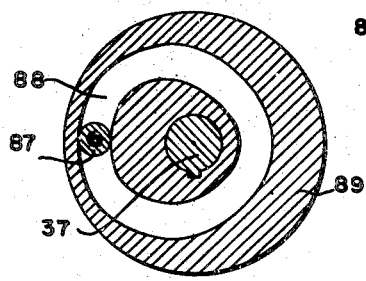
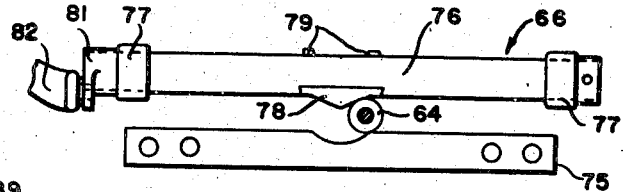
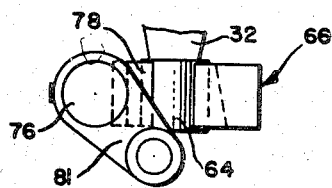
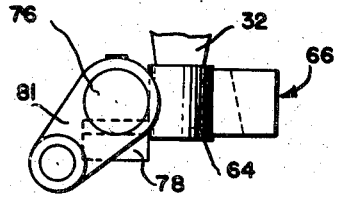

2,473,559

UNITED STATES PATENT OFFICE 2,473,559

APPARATUS FOR CUTTING TUBES

James L. Anderson, Closter, N. J., assignor to Air Reduction Company, Incorporated, New York, N. Y., a corporation of New York Application April 22, 1942, Serial No. 440,049

10 Claims. (Cl. 29—69)

This invention relates to apparatus for making predetermined lengths of tubing, such as condenser tubes.

It is an object of the invention to provide improved apparatus of the class wherein tubing comes from a welding machine, and passes through a straightening machine at a continuous rate, and is cut up into desired lengths by a cutting device such as a flying saw.

The improvements relate particularly to a simplified structure for synchronizing the operation of the welding, straightening, and cutting means; and to improved automatic cut-off apparatus for severing lengths from a continuously moving tube.

Another object of the invention is to provide apparatus suitable for high-speed work so that relatively short lengths can be cut from a rapidly moving tube.

Other objects, features and advantages of the invention will appear or be pointed out as the specification proceeds.

In the accompanying drawings, forming part hereof:

Fig. 1 is a diagrammatic, exploded view showing tube-making apparatus embodying the invention.

Fig. 2 is a side elevation, on an enlarged scale, of the cut-off machine that is shown diagrammatically in Fig. 1.

Fig. 3 is an enlarged sectional view on the line 3—3 of Fig. 2.

Fig. 4 is a top plan view of the cut-off machine that is shown in Fig. 2.

Fig. 5 is an end view of the cut-off machine shown in Fig. 2.

Figs. 6 and 7 are enlarged sectional views taken on the lines 6—6 and 7—7 of Fig. 5, respectively.

Figs. 8 and 9 are end views of the cam structure shown in Fig. 7 with the movable portion of the cam in different positions in the different views.

A portion of a welding machine is shown in Fig. 1 including the end of a multi-jet tip 10 which heats the seam edges of a tube 11 progressively as the tube, preferably formed from a continuous or long length strip, advances through the welding machine at a constant rate. The seam edges are brought together by welding rolls 12 which are connected to shafts 13 and 14. Both of these shafts are driven, the shaft 13 by bevel gearing 16 from a power shaft 17, and the lower shaft 14 by gears 18, 19 that transmit rotation of the upper shaft 13 to the lower shaft 14. The shaft 17 is driven by an electric motor 21 through a belt 22 that transmits motion from a pulley on the motor armature shaft to a pulley secured to the shaft 17.

The welded tube 11 comes from the power-driven welding rolls 12 into the first roll pass of a straightening machine. This first roll pass is formed by power driven rolls 24 on shafts 25, 26 that are driven from the power shaft 17 by gearing similar to that which transmits motion to the welding rolls 12.

A second roll pass of the straightening machine is formed by rolls 28 that are similar to the rolls 24 and similarly driven from the power shaft 17. A roll 29 in contact with the run of tube between the passes defined by rolls 24 and by rolls 28 straightens the continuously moving tube 11 in a manner well understood in the art.

After passing the rolls 28, the tube 11 comes to a flying saw that has a guide 31 through which the tube passes, and a guide support comprising a lever 32 fulcrumed on a carriage 33. This carriage is reciprocated back and forth and carries a saw that cuts lengths from the tube 11 during forward movement of the carriage and while the carriage is traveling at substantially the same speed as the tube 11.

The carriage 33 is reciprocated by a connecting rod 34 which is driven by a wrist pin 35 extending from a disk 36 that is secured on a shaft 37. The low speed end of a reduction gear unit 38 drives the shaft 37. The high speed end of the reduction gear unit 38 is equipped with a sprocket 39 that is driven by a chain 40 from a sprocket 41 at the low speed end of a variable speed transmission 42. Power is supplied to a sprocket 43 at the high speed end of the variable-speed transmission 42 through a chain 45 which extends around a sprocket 46 on the power shaft 17. The transmission 42 can be adjusted by a hand wheel 47 to give any desired speed ratio within a limited range. Slack in the chain 40 can be taken up by an adjustable idler 49 connected to a stationary part of the frame of the apparatus.

When the apparatus is to be adjusted to cut longer lengths, the transmission 42 is adjusted so as to reduce the speed of rotation of the disk 36 with respect to the speed of the power-driven rolls 12, 24, and 28 which feed the tube to the guide 31 in which the tube is cut. Such an adjustment permits a greater length of tube to pass for each full stroke of the carriage 33.

Since the speed of the tube is constant and the carriage 33 should be traveling at substantially tube speed at the time of cutting, provision is made to prevent a slower speed of the disk 36 from reducing the lineal speed of the carriage 33 at the time of cutting. In the preferred embodiment of the invention the wrist pin 35 is made adjustable to change its eccentricity on the disk 36 and thereby change the length of the stroke of the carriage. The apparatus for changing the eccentricity of the wrist pin will be described hereinafter in connection with Fig. 3. Lengthening the stroke of the carriage increases its maximum speed at the mid-point of the stroke and can therefore be made to compensate for a reduced speed of rotation of the disk 36.

The carriage 33 runs on a track comprising parallel tubes 51, best shown in Fig. 4. The connecting rod 34 is attached to the carriage 33 by a pin 52 that extends through a yoke 53 at one end of the carriage. In the preferred embodiment of the invention there are four wheels 54 (Fig. 2) on each side of the carriage, two of the wheels being located above the track tube 51 and two below. These wheels have grooved faces that fit the track tubes, and thus the wheels 54 prevent displacement of the carriage 33 in every direction except lengthwise of the track.

The length of the stroke of the carriage 33 as it is reciprocated back and forth along the track 51 can be regulated by adjusting the eccentricity of the wrist pin 35. The construction by which the wrist pin 35 is made adjustable toward and from the axis of the shaft 37 is shown in Fig. 3. The wrist pin 35 extends from a block 56 that is movable lengthwise in a radial slot 57 in the disk 36 by a lead screw 58. The back of the slot is covered by a plate 59 that is attached to the disk by screws.

The purpose of the radial adjustment of the wrist pin 35 is to change the speed of the carriage. For equal speeds of rotation of the disk 36, the further the wrist pin 35 is from the center of rotation of the disk, the higher will be the maximum, i. e. the mid-stroke, speed of the carriage. The eccentricity adjustment of the wrist pin 35 is limited to a relatively short part of the radius of the disk, and for speed adjustments of large proportions the speed ratio of the transmission 42 (Fig. 1) is changed. The transmission 42 can be adjusted to obtain the approximate carriage speed desired and the lead screw 58 (Fig. 3) then adjusted to make the mid-stroke speed of the carriage correspond accurately to the rate of travel of the tube.

The tube guide 31 is at the top of a lever 32 that extends downward and is supported by a shaft 62 (Fig. 5) which is connected to the carriage 33 by a bracket 63. A roller 64 at the bottom of the lever 32 extends into a slot in a cam 66 supported from a stationary part of the frame of the machine by a bracket 67.

A cut-off tool, preferably a disk saw 68 on the end of the armature shaft of a motor 69, is supported on the carriage 33. The housing of the motor 69 moves as a unit with the carriage 33 but is adjustable transversely of the carriage by a lead screw 71 turned by a knob 72. The guide 31 is made in two sections that are spaced from one another to leave a clearance or slot 73 (Fig. 4) through which the saw 68 can sever the tube 11 while the tube is passing through the guide 31. As the carriage 33 moves forward (to the right in Fig. 4) the speed of the carriage, and of the guide 31 that moves with the carriage, increases to a maximum at the mid-point of the carriage stroke. Severed lengths of tube rest on an extension 74 of the tube guide 31 and are pushed forward from this guide extension 74 by the advancing tube 11.

As the carriage 33 and tube guide 31 pass through this mid-stroke region, the roller 64 (Fig. 5) is displaced to the right and the lever 32 rocked counter-clockwise to move the guide 31 to the left and bring the tube against the saw. In the illustrated embodiment of the invention, the upper end of the lever 32 is longer than the lower so that the displacement of the guide 31 to bring the tube against the saw is greater than the throw of the cam. The use of a cam having a groove in which the cam-follower roller runs provides a positive displacement of the tube guide away from the saw, as well as towards it, and makes possible a faster operation, that is, more strokes, than could be satisfactorily obtained with an ordinary one-way displacement cam.

The cam 66 is shown in plan view in Fig. 7. It consists of two parts, a stationary bar 75 and a rod 76 that is held against all movement, except rotation, by bearing 77 which hold the ends of the rod. The rod 76 is of circular cross-section except at its mid-portion where an insert 78 is fastened to the rod by screws 79. This insert extends beyond the periphery of the rod 76 and serves as the high point of the cam. The space between the bar 75 and rod 76 is the groove of the cam and there is a recess in the bar 75 opposite the insert 78 so that the width of the groove is substantially uniform throughout the length of the cam. The groove is, of course, as long as the maximum stroke that the reciprocating apparatus can be adjusted to make, but since the insert 78 is in the middle of the stroke the relative time of cutting is not affected by change in the length of stroke.

It is essential that the cam 66 does not displace the roller 64 during the return stroke of the carriage, that is, when the carriage is moving toward the left and in the opposite direction to the movement of the tube 11. In order to render the cam 66 inoperative during the return stroke of the carriage, the rod 76 is turned 90° from the position shown in Fig. 8 to the position shown in Fig. 9. This quarter-turn of the rod 76 is effected between the time that the roller 64 passes the insert 78 on the forward stroke and the time that the roller reaches the insert on the return stroke. The rod 76 is turned by a crank 81 that is secured to one end of the rod.

The crank 81 is connected to a link 82 (Fig. 4) that extends across the machine to one end of a bell-crank 83 pivotally connected to the stationary frame of the machine. The other end of the bell-crank is connected by a link 84 with a lever 85, best shown in Fig. 2. The lever 85 rocks about a pivot 86 on the fixed frame of the machine.

There is a cam-follower comprising a roller 87 at the upper end of the lever 85 and this roller extends into a groove 88 in the face of a cam 89 secured to the shaft 37. The cam groove 88 is shown in Fig. 6 and is of such shape that the motion which it imparts to the roller 87 and to the links 84 and 82 causes the crank 81 to move in the desired relation with the reciprocations of the carriage 33.

Various changes and modifications can be made in the preferred embodiment of the invention, and some features can be used without others, without departing from the invention as defined in the claims.

I claim:

1. Tube-cutting apparatus including a flying saw, a first-class lever having a long upper arm and a shorter lower arm, said lever being movable about a fulcrum that moves lengthwise of the tube as an element of the flying saw, and the axis of which extends substantially parallel to the longitudinal axis of the tube, a tube guide supported at the upper end of the lever, a cam-follower on the lower end of the lever, and a stationary cam extending generally lengthwise of the direction of movement of the tube and having a cam slot into which the follower extends.

2. Cut-off apparatus including a rotary saw, a carriage supporting the saw, mechanism for reciprocating the carriage in the direction in which the axis of rotation of the saw extends, a tube guide through which a continuously moving tube travels in a direction substantially parallel to the axis of rotation of the saw, a lever extending downward from the guide and connected with the carriage by a pivot connection the axis of which is parallel to the axis of the tube, a cam-follower roller at the lower end of the lever remote from the tube guide, cam means for displacing the follower at least a portion of which is movable to another position to render the cam means ineffective to so displace the follower, said cam means being adapted before movement of its movable portion to said other position to displace the follower to cause movement of the guide both towards and away from the saw during the time the carriage is moving in the same direction as the tube, and mechanism for moving said portion of the cam means to said other position when the carriage moves in the opposite direction.

3. A machine for severing continuously moving pipe or the like, comprising a stationary frame, tracks mounted on the stationary frame, a carriage mounted on the stationary frame, means for reciprocating the carriage on the tracks, a saw mounted on the carriage, means mounted on the carriage for rotating the saw, a rocker arm pivotally attached to the carriage, a guide for supporting the pipe mounted on the rocker arm, a cam roller rotatably attached to the bottom of the rocker arm, a profile cam normally disposed beneath the path of the cam roller, means for elevating the profile cam into the path of the cam roller during reciprocation of the carriage to tilt the pipe into cutting engagement with the saw, and means for retracting the profile cam from the path of the cam roller after the cutting operation.

4. A machine for severing continuously moving pipe or the like comprising a frame, a reciprocable carriage on the frame, a saw on the carriage for cutting the pipe, a rocker arm pivoted to the carriage, a guide for the pipe at the upper end of the rocker arm, a roller on the lower end of the rocker arm, an elevatable cam on the frame, the profile of said cam being in the shape of a reversed curve, means for elevating the cam to make contact with the roller on the forward stroke of the carriage and for lowering the cam out of contact with the roller on the return stroke, driving means actuating the machine adjacent the carriage, a crank arm connected to the driving means, a pitman between the crank arm and the carriage for reciprocating the carriage, and means for synchronizing the elevation of the cam with the reciprocation of the carriage to cut the pipe on the forward stroke of the carriage.

5. A machine for severing continuously moving pipe or the like comprising a stationary frame a reciprocable carriage on the stationary frame, a circular saw on the carriage for cutting the pipe, a rocker arm pivoted to the carriage, a guide for supporting the pipe at the upper end of the rocker arm, a roller on the lower end of the rocker arm, a vertically reciprocable cam on the stationary frame having an outwardly curved face for making contact with the roller to cut the pipe, a motor mounted adjacent to the carriage, gearing driven by said motor, a crank arm actuated by said driven gearing, and a pitman mounted between the crank arm and the carriage for reciprocating the carriage.

6. Apparatus for cutting predetermined lengths from a continuously moving tube comprising a rotary saw, a carriage supporting the saw, mechanism for reciprocating the carriage in the direction of the longitudinal extent of the tube, a tube guide through which the tube travels, a lever extending downwardly from the guide and pivotally connected to the carriage, a cam-follower roller at the lower end of the lever, and cam means having a cam surface adapted to be engaged by the said roller during forward movement of the carriage and having a rise and fall over which the roller rides to cause movement of the guide toward and away from the saw during the forward movement of the carriage, and mechanism independent of the carriage for moving said cam surface to a different position so that it will not make contact with said roller during the return movement of the carriage.

7. Apparatus for cutting predetermined lengths from a continuously moving tube comprising a main framework, a carriage mounted on the framework, a cutting element mounted on the carriage, means for reciprocating the carriage in the direction of movement of the tube through the apparatus, means for supplying operating power to said reciprocating means, a guide element for supporting the tube during its travel through the apparatus, said guide element being mounted on the carriage for movement toward the cutting element, a shiftable cam-follower movable with the carriage and operatively connected to the guide element to move the guide element toward and away from the cutting element, movable cam means having a protruding profile cam surface to engage and shift the shiftable cam-follower, said cam means in one position having its protruding profile cam surface lying in the path of movement of the cam-follower during the forward movement of the carriage so that as the cam-follower rides over said protruding profile cam surface it will be shifted and cause the guide element to move toward the cutting element and in another position having its protruding profile cam surface lying out of the path of movement of the cam-follower during return movement of the carriage, mechanism mounted on a stationary portion of the framework for moving said cam means to its aforesaid positions and for holding the cam means substantially stationary when said protruding profile cam surface is in the path of movement of the cam-follower and the cam-follower is riding thereover, said mechanism including means synchronizing the movement of the cam means with the reciprocation of the carriage and operatively connected to the means for supplying operating power to the reciprocating means, and means mounted on the apparatus and operative, after the cam-follower has ridden over the protruding profile cam surface, to exert a force on the cam-follower to cause the guide element to move away from the cutting element.

8. Apparatus for cutting predetermined lengths from a continuously moving tube comprising a main framework, a carriage mounted on the framework, a cutting element mounted on the carriage, means for reciprocating the carriage in the direction of movement of the tube through the apparatus, means for supplying operating power to said reciprocating means, a guide element on the carriage for supporting the tube during its travel through the apparatus, a shiftable cam-follower movable with the carriage and operatively connected to one of said elements to cause relative movement of said elements transversely of the direction of movement of the tube through the apparatus, movable cam means having a protruding profile cam surface to engage and shift the shiftable cam-follower, said cam means in one position having its protruding profile cam surface lying in the path of movement of the cam-follower during the forward movement of the carriage so that as the cam-follower rides over said protruding profile cam surface it will be shifted and cause relative movement of the cutting element and guide element toward each other and in another position having its protruding profile cam surface lying out of the path of movement of the cam-follower during return movement of the carriage, mechanism mounted on a stationary portion of the framework for moving said cam means to its aforesaid positions and for holding the cam means substantially stationary when said protruding profile cam surface is in the path of movement of the cam-follower and the cam-follower is riding thereover, said mechanism including means synchronizing the movement of the cam means with the reciprocation of the carriage and being operatively connected to the means for supplying operating power to the reciprocating means, and means mounted on the apparatus and operative, after the cam-follower has ridden over the protruding profile cam surface, to exert a force on the cam-follower to cause relative movement of the cutting element and the guide element away from each other.

9. Apparatus for cutting predetermined lengths from a continuously moving tube comprising a main framework, a carriage mounted on the framework, a cutting element mounted on the carriage, means for reciprocating the carriage in the direction of movement of the tube through the apparatus, means for supplying operating power to said reciprocating means, means for varying the speed of reciprocation of the carriage, means for synchronizing the midstroke speed of the carriage with the speed of the continuously moving tube, a guide element on the carriage for supporting the tube during its travel through the apparatus, a shiftable cam-follower movable with the carriage and operatively connected to one of said elements to cause relative movement of said elements transversely of the direction of movement of the tube through the apparatus, movable cam means having a protruding profile cam surface to engage and shift the shiftable cam-follower, said cam means in one position having its protruding profile cam surface lying in the path of movement of the cam-follower during the forward movement of the carriage so that as the cam-follower rides over said protruding profile cam surface it will be shifted and cause relative movement of the cutting element and guide element toward each other and in another position having its protruding profile cam surface lying out of the path of movement of the cam-follower during return movement of the carriage, mechanism mounted on a stationary portion of the framework for moving said cam means to its aforesaid positions and for holding the cam means substantially tationary when said protruding profile cam surface is in the path of movement of the cam-follower and the cam-follower is riding thereover, said mechanism including means synchronizing the movement of the cam means with the reciprocation of the carriage and being operatively connected to the means for supplying operating power to the reciprocating means, and means mounted on the apparatus and operative, after the cam-follower has ridden over the protruding profile cam surface, to exert a force on the cam-follower to cause relative movement of the cutting element and the guide element away from each other.

10. Apparatus for cutting predetermined lengths from a continuously moving tube comprising a main framework, a carriage mounted on the framework, a cutting element mounted on the carriage, means for reciprocating the carriage in the direction of movement of the tube through the apparatus, means for supplying operating power to said reciprocating means, a frame pivotally mounted on the carriage, a guide element mounted on one end of the frame to support the tube during its travel through the apparatus, a shiftable cam-follower mounted on the other end of said frame, said cam-follower being shiftable to pivot the frame and cause the guide element to move toward and away from the cutting element, movable cam means having a protruding profile cam surface to engage and shift the cam-follower, said cam means in one position having its protruding profile cam surface lying in the path of movement of the cam-follower during the forward movement of the carriage so that as the cam-follower rides over said protruding profile cam surface it will be shifted to pivot the frame and cause the guide element to move toward the cutting element and in another position having its protruding profile cam surface lying out of the path of movement of the cam-follower during return movement of the carriage, mechanism mounted on a stationary portion of the framework for moving said cam means to its aforesaid positions and for holding the cam means substantially stationary when said protruding profile cam surface is in the path of movement of the cam-follower and the cam-follower is riding thereover, said mechanism including means synchronizing the movement of the cam means with the reciprocation of the carriage and being operatively connected to the means for supplying operating power to the reciprocating means, and means mounted on the apparatus and operative, after the cam-follower has ridden over the protruding profile cam surface, to exert a force on the cam-follower to pivot the frame and cause the guide element to move away from the cutting element.

JAMES L. ANDERSON.

REFERENCES CITED

The following references are of record in the file of this patent:

UNITED STATES PATENTS

| Number | Name | Date |
|---|---|---|
| 556,857 | Madden | Mar. 24, 1896 |
| 558,646 | Hardie | Apr. 21, 1896 |
| 1,027,865 | Lloyd | May 28, 1912 |
| 1,037,675 | Simpson | Sept. 3, 1912 |
| 1,418,437 | Grupe | June 6, 1922 |
| 1,424,179 | Pritchard | Aug. 1, 1922 |
| 1,439,963 | Kamper | Dec. 26, 1922 |
| 1,498,550 | Johnston | June 24, 1924 |
| 1,549,429 | Bartlett | Aug. 11, 1925 |
| 1,684,617 | Biggert | Sept. 18, 1928 |
| 1,803,020 | Kalgren | Apr. 28, 1931 |
| 1,844,837 | Braun | Feb. 9, 1932 |
| 1,973,515 | Talbot | Sept. 11, 1934 |
| 1,996,617 | Hahn | Apr. 2, 1935 |
| 2,019,465 | Rubin | Oct. 29, 1935 |
| 2,079,974 | Traut | May 11, 1937 |
| 2,350,975 | Rodder | June 6, 1944 |